United States Patent [19]

Nikura

[11] Patent Number: 4,883,994
[45] Date of Patent: Nov. 28, 1989

[54] LINEAR MOTOR
[75] Inventor: Hideo Nikura, Tokyo, Japan
[73] Assignee: Sony Corporation, Tokyo, Japan
[21] Appl. No.: 149,698
[22] Filed: Jan. 29, 1988

Related U.S. Application Data

[62] Division of Ser. No. 918,151, Oct. 14, 1986, Pat. No. 4,803,388.

[30] Foreign Application Priority Data

Oct. 28, 1985 [JP] Japan ............................... 60-241144

[51] Int. Cl.⁴ ............................................. H02K 41/00
[52] U.S. Cl. ........................................ 310/12; 318/135
[58] Field of Search ................................... 310/12–14, 310/15, 17, 22; 318/37, 38, 135

[56] References Cited

U.S. PATENT DOCUMENTS

| | | |
|---|---|---|
| 3,202,886 | 8/1965 | Kramer . |
| 3,453,510 | 7/1969 | Kreuter ................... 310/14 |
| 3,707,924 | 1/1973 | Barthalon et al. . |
| 3,999,107 | 12/1976 | Reuting . |
| 4,233,906 | 11/1980 | Seiler . |
| 4,335,338 | 6/1982 | Sawyer . |
| 4,439,699 | 3/1984 | Brende et al. . |
| 4,603,270 | 7/1986 | van Davelaar ................ 310/13 |
| 4,697,113 | 9/1987 | Young ........................ 310/15 |
| 4,803,388 | 2/1989 | Nikura ....................... 310/12 |

FOREIGN PATENT DOCUMENTS

| | | | |
|---|---|---|---|
| 2312668 | 9/1973 | Fed. Rep. of Germany ........ | 310/13 |
| 0379025 | 4/1973 | U.S.S.R. ............................ | 310/13 |

OTHER PUBLICATIONS

IBM Tech. Discl. Bulletin; vol. 15, No. 3; 08/72; "Linear Actuator" by H. D. Chai et al.

Primary Examiner—R. Skudy
Attorney, Agent, or Firm—Hill, Van Santen, Steadman & Simpson

[57] ABSTRACT

A linear motor comprises a first yoke, a second yoke spaced apart the width of a first gap from the first yoke, a current-carrying coil surrounding at least one of the first yoke and the second yoke, a magnet spaced apart the width of a second gap from the first and second yokes, and the end portion of the magnet extending over the first gap from one of the first yoke and the second yoke to the other thereof, when the magnet is in a starting position or in an initial position, whereby a relative movement between the magnet and the first and second yokes are obtained.

3 Claims, 8 Drawing Sheets 4,883,994

LINEAR MOTOR

This is a division, of application Ser. No. 918,151, filed Oct. 14, 1986 U.S. Pat No. 4,803,38.

BACKGROUND OF THE INVENTION

1. Field of the Invention

This invention relates to a linear motor, wherein a magnet and a current-carrying coil are relatively and linearly moved each other, the linear motor being the most suitably applied to moving parts of an electronic equipment, such as feed mechanism of a head used in a disk player of the like.

2. Description of the Prior Art

The moving-coil type linear motor, for example, shown in FIG. 1 is well-known (cf. U.S. Pat. No. 4,439,699). In FIG. 1, a core 2 is so provided as to connect the center portions of one pair of opposite members of a box frame, namely, a yoke 1. A bobbin 4 which is surround by a coil 3 and into which the core 2 loosely fits, is movable in direction of arrow a or b. And magnets 5 and 6 which are magnetized in thickness directions thereof, are attached to the respective inside faces of the other pair of opposite members of the yoke 1.

When an electric current supplied to the coil 3 is sent through magnetic flux, the coil 3 and bobbin 4 are moved in the direction of a or b. Such a linear motor as mentioned above is used, for example, for the feed devices of optical pickups in an optical disk player or the like.

However, the above linear motor has several weak points as mentioned below:

(1) As the coil 3 is moved within a gap $L_g$ made between the magnet 5, 6 and core 2, the width of the gap $L_g$ and the thickness of the magnet 5, 6 are usually similar to each other, so that the magnetic flux density of the magnet 5, 6 becomes only about one-third to one-fourth of the residual flux density of the magnet 5, 6. Therefore, the magnetization intensity of the magnet 5, 6 are not fully utilized.

(2) Magntic flux is concentrated at the four corners of the yoke 1. Therefore, if the thickness of the yoke 1 is decided on the basis of the corner, the yoke 1 becomes rather large.

(3) As the magnetic flux generated by the current supplied to the coil 3, follows the loop formed by the yokes 1 and core 2, the self-inductance of the coil 3 becomes large, so that the electric current decreases when the bobbin is to be moved on high speed. Therefore, the thrust is reduced and the response falls away.

(4) The coil 3 is wound around the hollow bobbin 4 made of such a material as to be rather inferior in a heat conduction characteristic, so that the heat generated in the coil 3 is not evolved enough.

(5) The construction that the core 2 is fitted in the bobbin 4, makes the assembling work difficult.

OBJECTS AND SUMMARY OF THE INVENTION

Accordingly, it is an object of the present invention to provide a linear motor capable of being made compact and light.

More specifically, it is an object of this invention to provide a linear motor having a high thrust.

A further object of the invention is to provide a linear motor excellent in a high speed response.

Still another object of the invention is to provide a linear motor capable of making the consumption of an electric power small.

Still another object of the invention is to provide a linear motor capable of making it easy to assembly parts.

DETAILED DESCRIPTION OF PREFERRED EMBODIMENT

Figure 2:
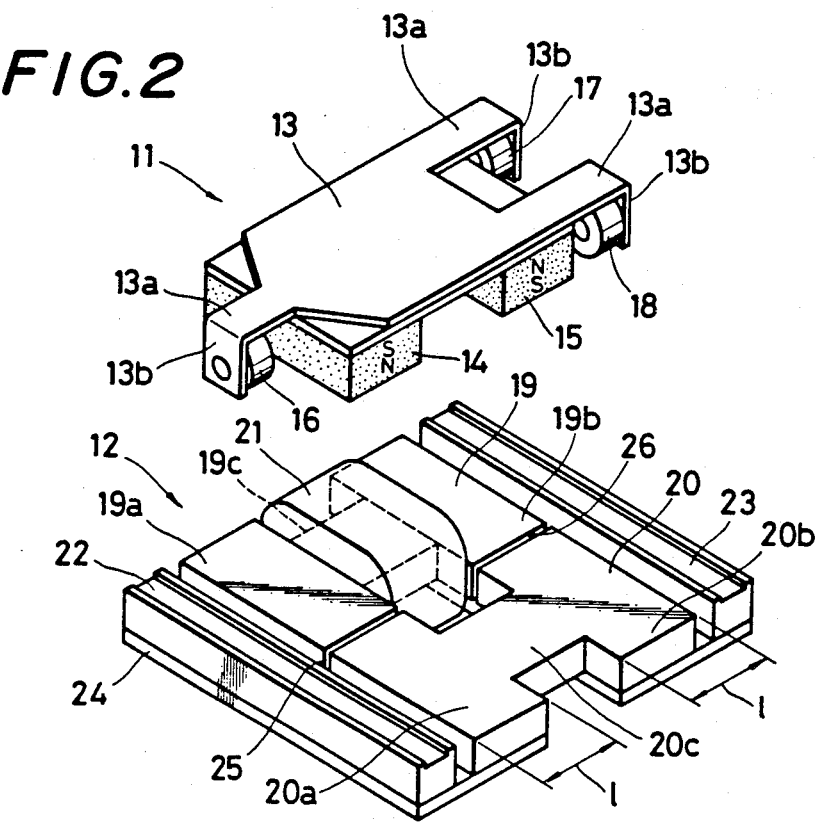
FIG. 2 is an exploded, perspective view of a linear motor according to an embodiment of this invention.
Figure 3:
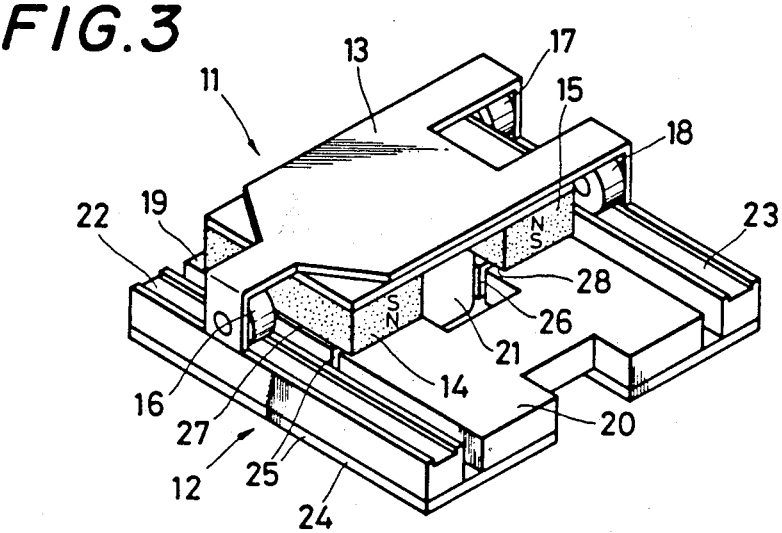
FIG. 3 is a perspective view of the linear motor of FIG. 2.

A first embodiment of this invention is illustrated in FIGS. 2 and 3. A linear motor shown in the drawings is a moving-magnet type linear motor comprising a moved portion 11 and a fixed portion 12.

The moved portion 11 includes a yoke 13 of plate and a pair of magnets 14 and 15 which are fixed to the lower surface of the yoke 13 and magnetized in thickness directions thereof as illustrated in FIGS. 2 and 3. Formed in the sides of the yoke 13 are a plurality of arms 13a. In the ends of the arms 13a, there are bent portions, to which respective rollers 16, 17 18 are rotatably secured.

The fixed portion 12 includes pair of yokes 19 and 20, and a coil wound around the yoke 19. Provided near the both sides of the yokes 19 and 20 are respective guide rails 22, 23, on which the rollers 16, 17, 18 move. The pair of yokes 19 and 20 and guide rails 22 and 23 are fixed to a base plate 24 by the help of predetermined means, such as adhesion or the like.

The yoke 19, 20 has two portions 19a and 19b, or 20a and 20b of width 1 which are provided in opposed relation to respective magnets 14, 15, and a connecting portion 19c or 20c to join the portions 19a and 19b, or 20a and 20b. The coil 21 is wound around the connecting portion 19c. The sides of the portions 19a and 19b of the yoke 10 are placed in opposed relation to the sides of the portions 20a and 20b, and between the sides of the portions 19a and 20a, 19b and 20b, there are respective air gaps 25, 26 which are about 0.2 to 0.5 mm in width. And when the rollers 16, 17 and 18 are rotatably fitted in the guide rails 22 and 23 so as to position the moved portion 11 over the fixed portion 12, air gaps 27, 28 formed between the magnet 14 and the portion 19a, 20a of the yoke 19, 20, or between the magnet 15 and the portion 19b, 20b of the yoke 19, 20 are about 0.2 to 0.5 mm in width.

Figure 4:
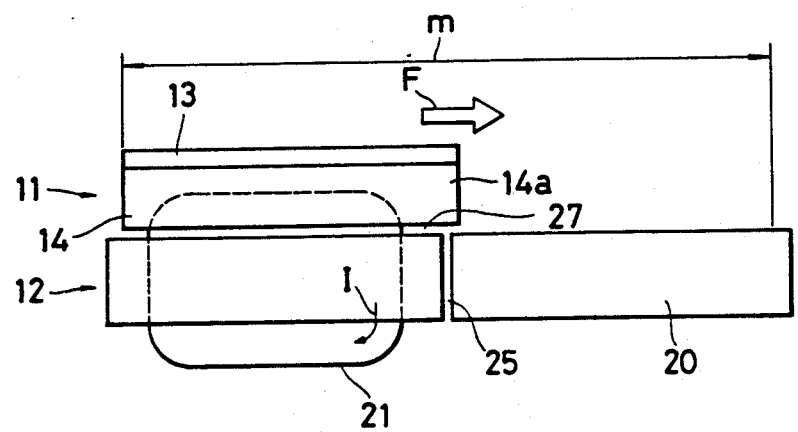
FIG. 4 is a side view of the linear motor of FIG. 3 for illustrating the principle thereof.

In FIG. 4, the moved portion 11 is in a starting position (or in an initial position). The greater part of the magnet 14, 15 is located in the opposed relation to the yoke 19, and the front end part 14a, 15a thereof extends over the gap 25, 26 in opposed relation to the yoke 20. Therefore, the greater part of the magnetic flux generated by the magnets 14 and 15 follows the gaps 27, 28 and yoke 19, and the rest of the magnetic flux follows the gaps 27, 28 and yoke 20, so that the moved portion 20 is moved in direction of arrow F in FIG. 4, which indicates the direction of a force mentioned later.

As the moved portion 11 moves, the area where the magnet 14, 15 and yoke 19 are in opposed relation to each other decreases and the area where the magnet 14, 15 and yoke 20 are in opposed relation to each other increases, so that the magnetic flux following the yoke 19 decreases and the magnetic flux following the yoke 20 increases.

On the supposition that the leakage of the magnetic flux followed by the yokes 19 and 20 is small when the moved portion 11 is moved by a distance $\Delta x$, the increment $\Delta \Phi$ of the magnetic flux followed by the yoke 19 is give as follows.

$$\Delta \Phi = B \cdot \Delta x \cdot l$$

where B: flux density A force F acting between the magnets 14 and 15 and the yoke 19 is, $$F = N \cdot I \cdot \partial \Phi / \partial x$$

where N: the number of turns of the coil 21

I: the current strength. As the rate of flux change $\partial \Phi / \partial x$ is constant until the magnets 14 and 15 are deviated from the coil 21, the force F is given as follows.

$$F = N \cdot I \cdot \partial \Phi / \partial x = N \cdot I \cdot B \cdot l \quad (=\text{const.})$$

As the electric current is supplied in reverse, the force F given by the above equation acts also in the reverse sense.

Thus, the rate of flux change can be kept constant even though the moved portion 11 moves, because the gaps 25 and 26 are prepared between the yokes 19 and 20. The moved portion 11 is moved within a movable extent m by the force F generated in proportion to the rate of flux change. At any rate, the rate of flux change is still constant even though the yoke 20 is omitted, but as the moved portion 11 moves, it is brought back by the attracting force generated between the yoke 19 and the magnets 14 and 15 in the sense reverse to that of the force F.

In the first embodiment, the yoke 20 is provided apart from the yoke 19 by the width of the gaps 25, 26, so that not only the rate of flux change is constant, but also the attracting forces of the magnets 14 and 15 are constant. Therefore, the moved portion 11 moves without being influenced by the attracting forces.

According to the first embodiment, the following effects are obtained.

(1) By means of making the gaps 27 and 28 smaller so as to make the flux density within the gaps larger, the magnetization intensity of the magnets 14 and 15 is effectively utilized.

(2) There is no place where the magnetic flux concentrates, so that it is unnecessary to make the thicknesses of the yokes 19 and 20 large. Therefore, it is easy to make the moved portion and fixed portion small.

(3) By means of making the connecting portion 19c, which the coil 21 surrounds, so slender as not to be saturated with the magnetic flux, it is possible to make the resistance Rm of the coil 21 small without changing the number of turns of the coil 21. Therefore, even though the input power Pin ($=Rm \cdot I^2$) is unchanged, a greater thrust is obtained.

Figure 1:
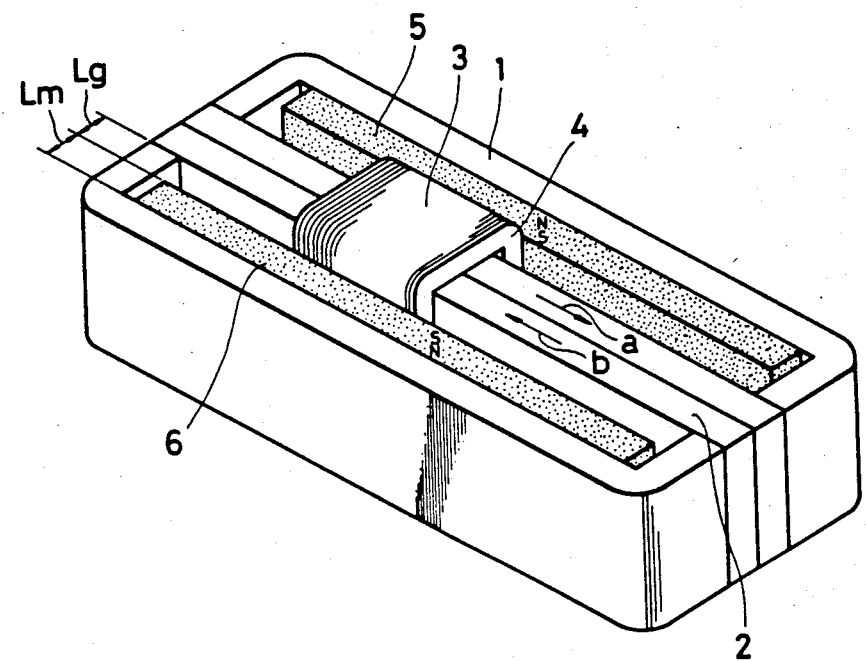
FIG. 1 is a perspective view of a conventional linear motor.

(4) The magnetic circuit followed by the magnetic flux generated by the coil 21 includes the gaps 27 and 28, so that it is possible to make the self-inductance of the coil 21 small as compared with that of the coil of the moving-coil type linear motor shown in FIG. 1. Therefore, it is easy to obtain a linear motor excellent in response.

(5) As the coil 21 is wound around the connecting portion 19c which is a part of the yoke 19, cooling efficiency of the coil 21 is improved, so that input power can be increased so as to make the thrust larger.

(6) It becomes easy to assembly the linear motor.

Figure 5:
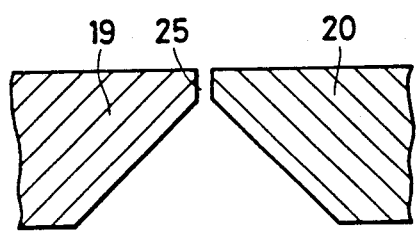
FIGS. 5 and 6 are side views of a gap for illustrating two kinds of section, respectively.
Figure 6:
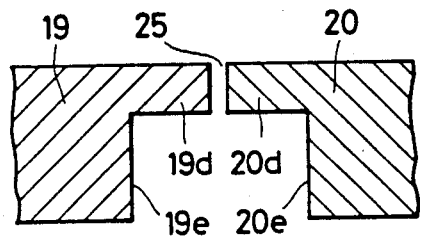

FIGS. 5 and 6 show two examples of sectional figures of the gap 25, 26. The gap 25, 26 must be so formed as to make the leakage flux out of the yokes 19, 20 small as much as possible and make the rate of flux change $\partial \Phi / \partial x$ constant. To make the rate of flux change almost constant and not to be influenced by the attracting force, the gap 25, 26 is so formed as to enable the yokes 19 and 20 to be partially brought near to each other and to have the rest of the yokes 19 and 20 much separated. More specifically, the gap 25, 26 is to be so formed as to have a section of almost triangular shape as shown in FIG. 5 or a section consisting of a projecting potrion 19d, 20d and a stepped portion 19e, 20e continued from the projecting portion 19d, 20d as shown in FIG. 6.

Figure 7:
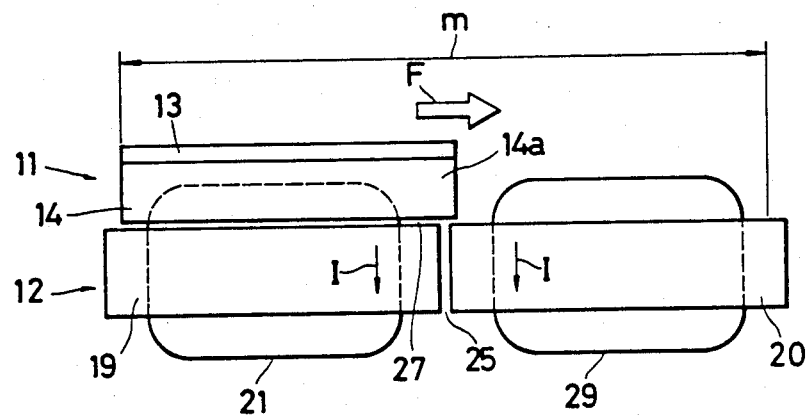
FIGS. 7 and 8 are schematic side views of linear motors according to a second and third embodiments of this invention, respectively.

FIG. 7 schematically shows a second embodiment of this invention, wherein coils 21 and 29 are provided around the respective yokes 19 and 20. The coil 29 surrounds the connecting portion 20c of the yoke 20 as the coil 19 does. In the embodiment, the moved portion 11 is affected by the force $F = 2 \cdot N \cdot B \cdot I \cdot l$ and moves within a movable extent m.

Figure 8:
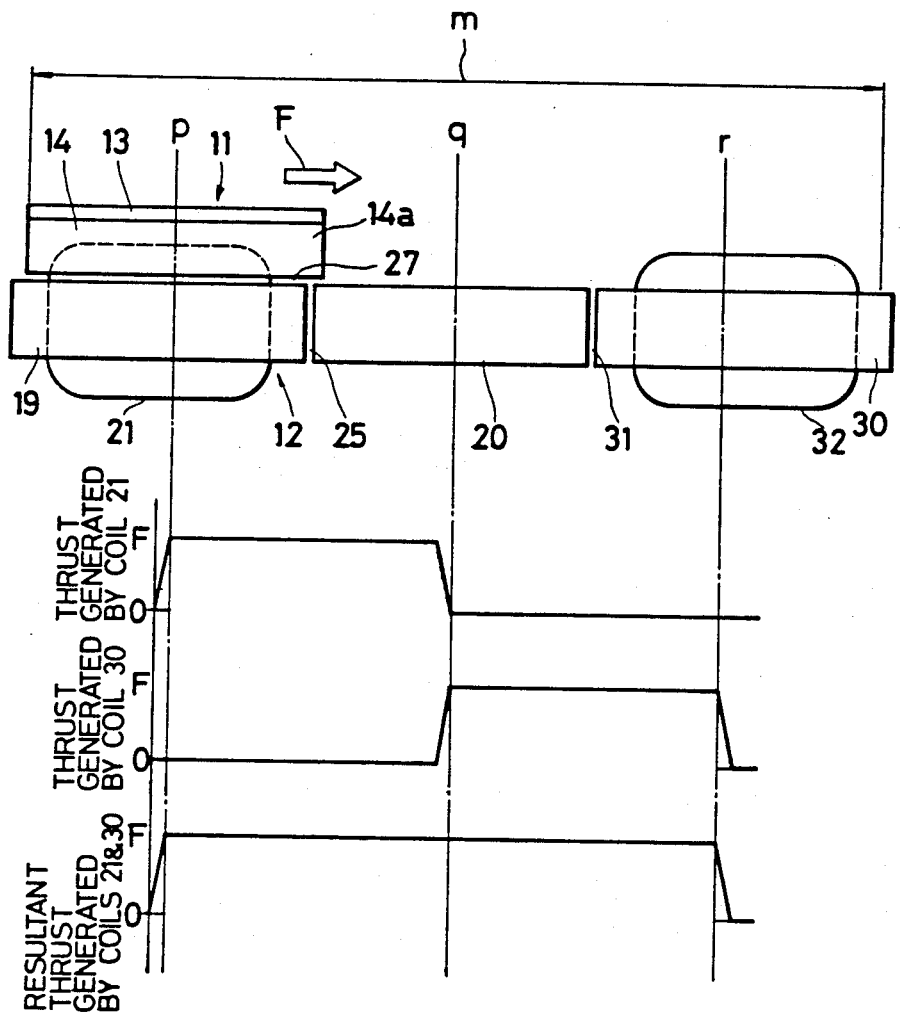

FIG. 8 shows a third embodiment, wherein three yokes 19, 20 and 30 are arranged in turn, gaps 25, 31 are provided among the yokes 19, 20 and 30, and a coil 32 is wound around the yoke 30, too. The yoke 30 has the same shape as the yokes 19 and 20 have and the coil 32 surrounds the connecting portion of the yoke 30.

In FIG. 8, the moved portion 11 is moved by a force generated by the coil 21 from point p to point q, and moved by a force generated by the coil 32 from point q to point r. Therefore, a thrust acting on the moved portion 11 is a resultant force that is the sum of the forces generated by the coils 21 and 32. In this embodiment, the movable range m of the moved portion 11 is about twice as much as that in case of the first or the second embodiments. By means of alternately and linearly arranging the yoke 19 with a coil and the yoke 20 without any coil as shown in FIG. 8, it is easy to make the movable range m of the moved portion 11 larger.

Furthermove, by means of two-dimensionally arranging the yokes 19 and 20 as mentioned above, it is also easy to make the movable range of the moved portion 11 two-dimensional.

Figure 9:
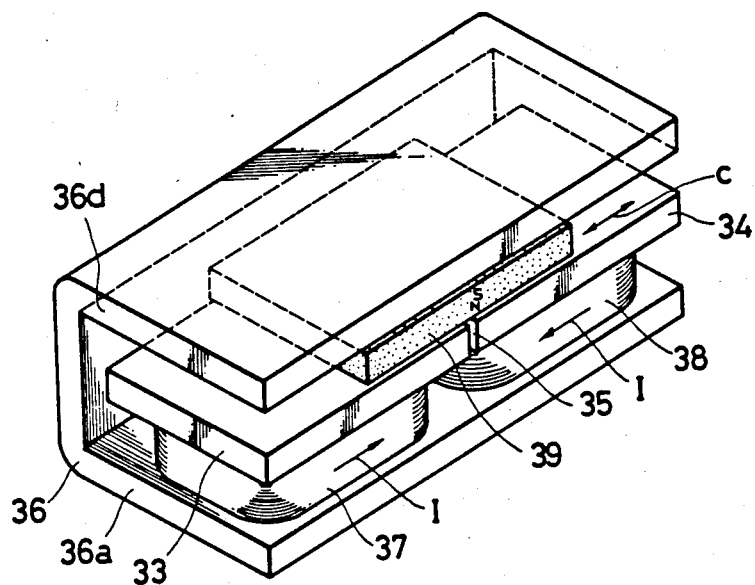
FIG. 9 is a perspective view of a linear motor according to a fourth embodiment of this invention.
Figure 10:
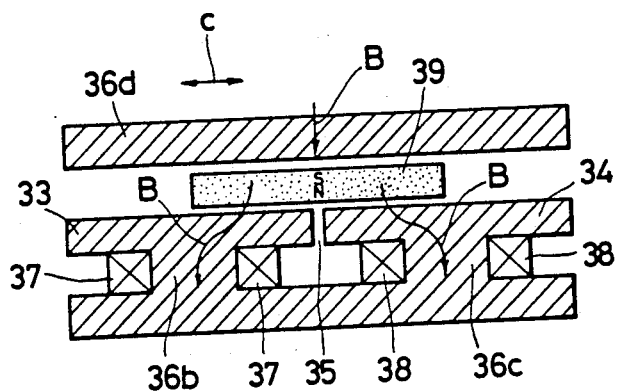
FIG. 10 is a schematic side view of the linear motor of FIG. 9.

FIGS. 9 and 10 show a fourth embodiment, wherein a gap 35 is provided between yokes 33 and 34, which are connected to the lower flange 36a of a yoke 36 of U-shape in section through respective connecting portions 36b and 36c, and coils 37 and 38 are wound around the respective connecting portions 36b and 36c.

Furthermore, a magnet 39 is provided between the yokes 33, 34 and the upper flange 36d of the yoke 36, and so spaced apart predetermined gaps from the yokes 33, 34, 36 so as to make the magnet 39 movable in direction of arrow c. Thus, the magnet 39 is moved upon the same principle as mentioned in the first to third embodiments.

Figure 11:
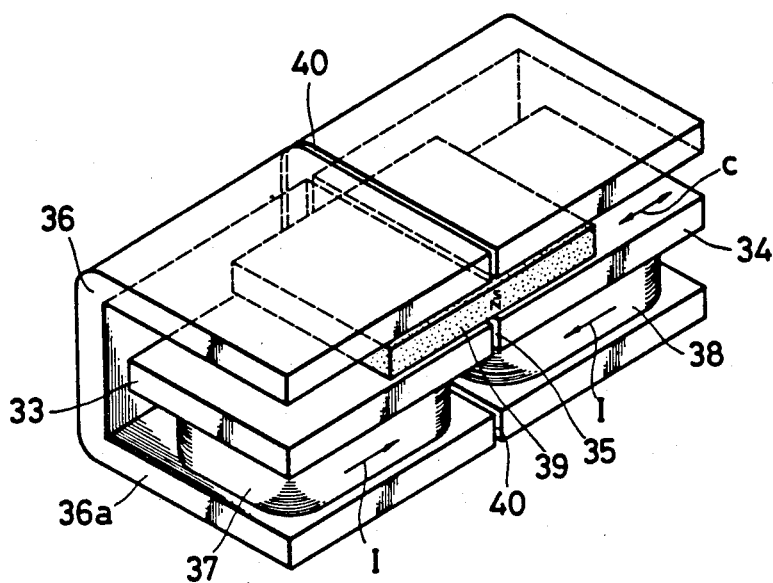
FIG. 11 is a perspective view of a linear motor according to a fifth embodiment of this invention.

FIG. 11 shows a fifth embodiment, wherein a gap 40 is so provided in the yoke 36 shown in FIG. 9 as to be in alignment with the gap 35. Meanwhile, the magnet 39 in the fourth embodiment shown in FIGS. 9 and 10 and in the fifth embodiment shown in FIG. 11 is supported by an external means.

Figure 12:
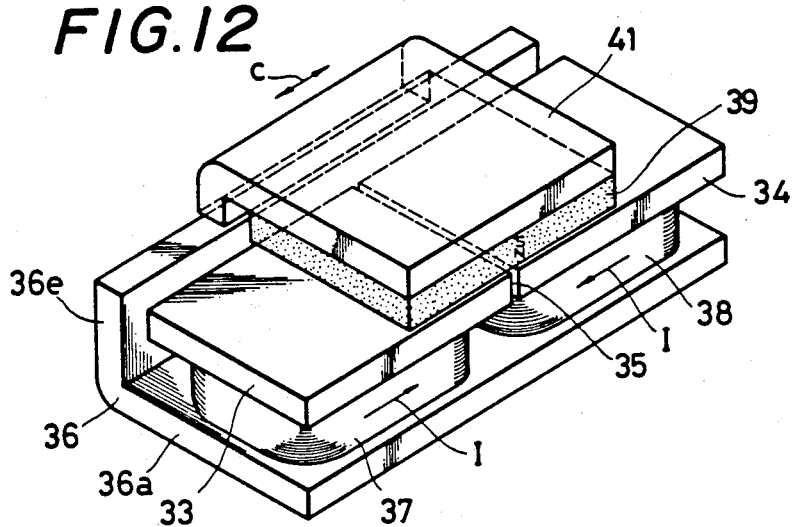
FIG. 12 is a perspective view of a linear motor according to a sixth embodiment of this invention.
Figure 13:
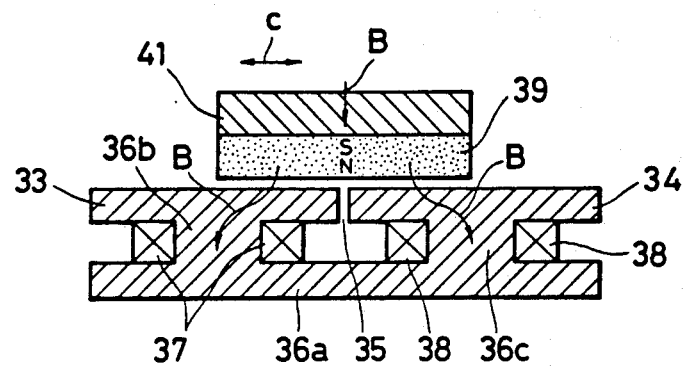
FIG. 13 is a schematic side view of the linear motor of FIG. 12.

FIGS. 12 and 13 shown a sixth embodiment. In the drawings, the same reference numerals are used when the portions are in correspondence with those shown in FIGS. 9 and 10. In the sixth embodiment, yokes 33 and 34 are so arranged as to be spaced apart from each other by a gap 35, and a yoke 36 which has a L-shaped section and the vertical flange of which is designated by reference numeral 36e is provided. The horizontal flange 36a of the yoke 36 is combined with the yokes 33, 34 through connecting portions 36b, 36c, around which coils 37, 38 are wound, respectively. Further, a magnet 39 fixed to a yoke 41 and spaced apart by a predetermined gap from the yokes 33 and 34 is moved in direction of arrow c as it is in the another embodiments.

Figure 14:
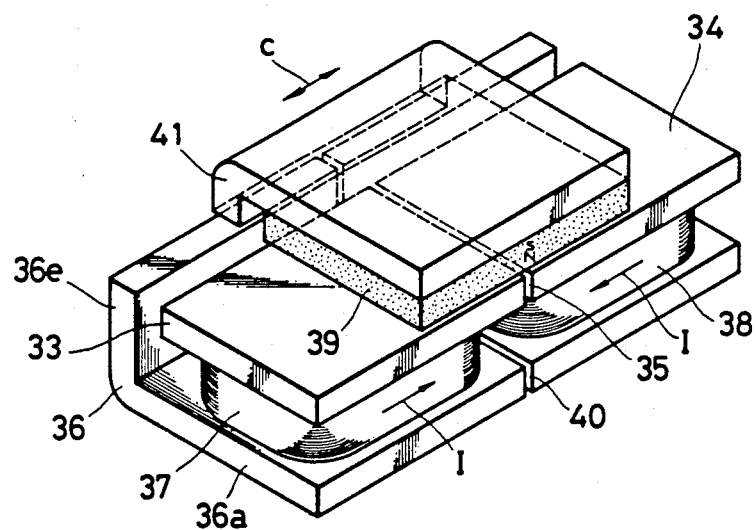
FIG. 14 is a perspective view of a linear motor according to a seventh embodiment of this invention.

FIGS. 14 shows a seventh embodiment, wherein a gap 40 is provided in the yoke 36. In the seventh embodiment, the yoke 36 divided into two due to the gaps 35 and 40 is fixed to a base plate (not shown) by the use of predetermined means in order to keep the widths of the gaps 35 and 40 constant. Furthermore, by means of linearly arranging a number of the divided yokes 36, it is possible to make the movable range of the magnet 39 larger.

Figure 15:
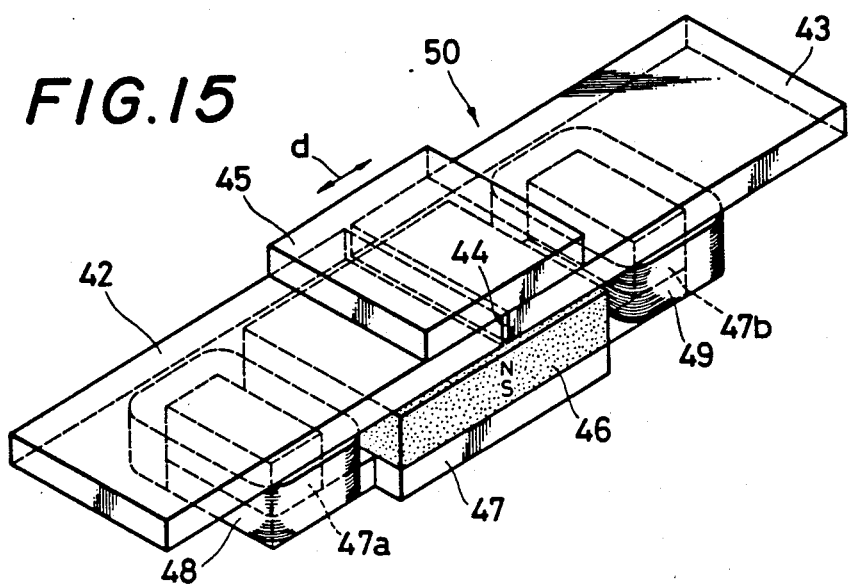
FIG. 15 is a perspective view of a linear motor according to a eighth embodiment of this invention.
Figure 16:
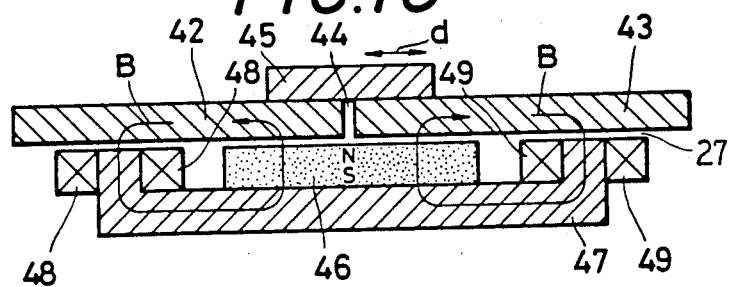
FIG. 16 is a schematic side view of the linear motor of FIG. 15.

FIGS. 15 and 16 show an eighth embodiment. In the eighth embodiment, a gap 44 is provided between two yokes 42 and 43 which are connected integrally to each other by a member 45 made of non-magnetic material, and a magnet 46 is so provided in opposed relation with the yokes 42, 43 and gap 44 as to be spaced apart to form a gap from the yokes 42, 43 and gap 44.

The magnet 46 is fixed to a yoke 47, around both end portions 47a and 47b of which coils 48 and 49 are wound, respectively. A moved portion 50 comprising the yokes 42, 43 and member 45 is supported by an external means in order to keep the gap constant, and moved in direction of arrow d.

Figure 17:
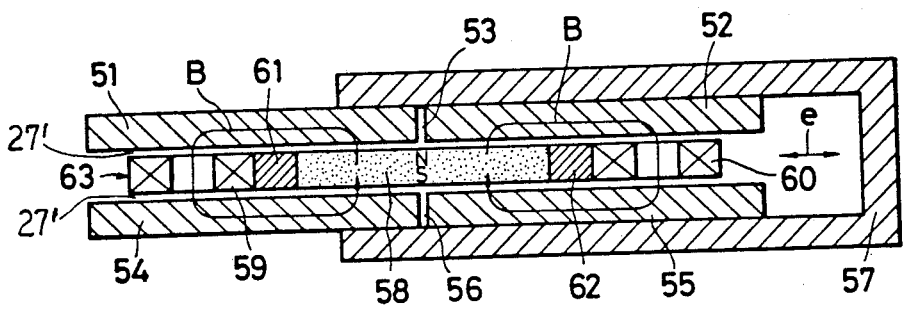
FIG. 17 is a sectional view of a linear motor according to a ninth embodiment of this inveniton.

FIG. 17 shows a ninth embodiment. A gap 53 is provided between two yokes 51 and 52. In opposed relation are two yokes 54 and 55 which are so arranged as to be spaced apart the width of gap from the yokes 51, 52 and gap 53, and further, the yokes 51, 52, 54 and 55 are connected by a connecting member 57 of U-shape in section and of non-magnetic material. As shown in FIG. 17, the two yokes 54 and 55 are spaced apart by a gap 56 which has the same width as the gap 53. A movable portion 63 comprises a magnet 58 and coils 59 and 60 for generating a magnetic flux B secured to the respective ends of the magnet 58 through pieces 61, 62 made of non-magnetic material, and is movable in direction of arrow e within the gap formed between the yokes 51, 52 and the yokes 54, 55. The movable portion 63 is supported by an external means such as rollers riding on guide rails as shown in FIGS. 2 and 3 and as described above, in order to keep gaps 27' between the magnet 58 and the respective yoke pairs 51 and 52, and 54 and 55 constant.

Also in the fourth to ninth embodiments mentioned above, the moved portion is moved upon the same principle as that mentioned in the first to third embodiments, and the above-mentioned effects (1) to (5) are also obtained.

According to the linear motor to which the present invention is applied, it is possible not only to make the flux density within the gaps higher but also to prevent the concentration of flux so as to obtain a uniform distribution of flux as much as possible. Hence, it is easy to make the yoke thin in thickness so as to make the linear motor compact and light and obtain the linear motor having a high thrust. Furthermore, it is possible to make the inductance of the coil small and to make the linear motor excellent in a high speed response. In addition, the coil functions effectively and thermal radiation of the coil is improved, so that the linear motor of this invention has the advantage that it can be made compact and have a high thrust, the electric power consumption thereof becomes small and the assembling operation thereof becomes easy.

What is claimed is:

1. A linear motor comprising:
    a first yoke and a second yoke spaced apart the width of a first gap from each other;
    a magnet spaced apart the width of a second gap from and arranged in opposed relation to said first yoke and second yoke;
    a coil fixed to the end of said magnet through a non-magnetic material;
    a third yoke and a fourth yoke spaced apart the same width of a gap as that of said first gap from each other and so arranged in opposed relation to said magnet as to be spaced apart the same width of a gap as that of said second gap from said magnet; and
    a member of nonmagnetic material having a substantially U-shaped section and connecting said first and second yokes to said third and fourth yokes.

2. A linear motor, comprising:
    a first yoke;
    a second yoke spaced apart a predetermined width of a first narrow gap from said first yoke;
    a coil positioned to generate a magnetic flux through at least one of said first yoke and said second yoke;
    a magnet provided in opposed relation with and spaced apart a predetermined width of a second gap from said first and second yokes, said magnet being movable relative to said first and second yokes and said first gap;
    third yoke;
    a fourth yoke spaced from said third yoke by a gap of substantially a same width as said first narrow gap, said third and fourth yokes positioned opposed to said first and second yokes; and
    said magnet being positioned between said first and second yokes on one hand and said third and fourth yokes on the other hand.

3. A linear motor as claimed in claim 2, wherein said coil is affixed to an end of said magnet.

* * * * *